Nov. 10, 1942.                F. W. BURGER                    2,301,680
                             AXLE CONSTRUCTION
                          Filed Oct. 25, 1940            2 Sheets-Sheet 1
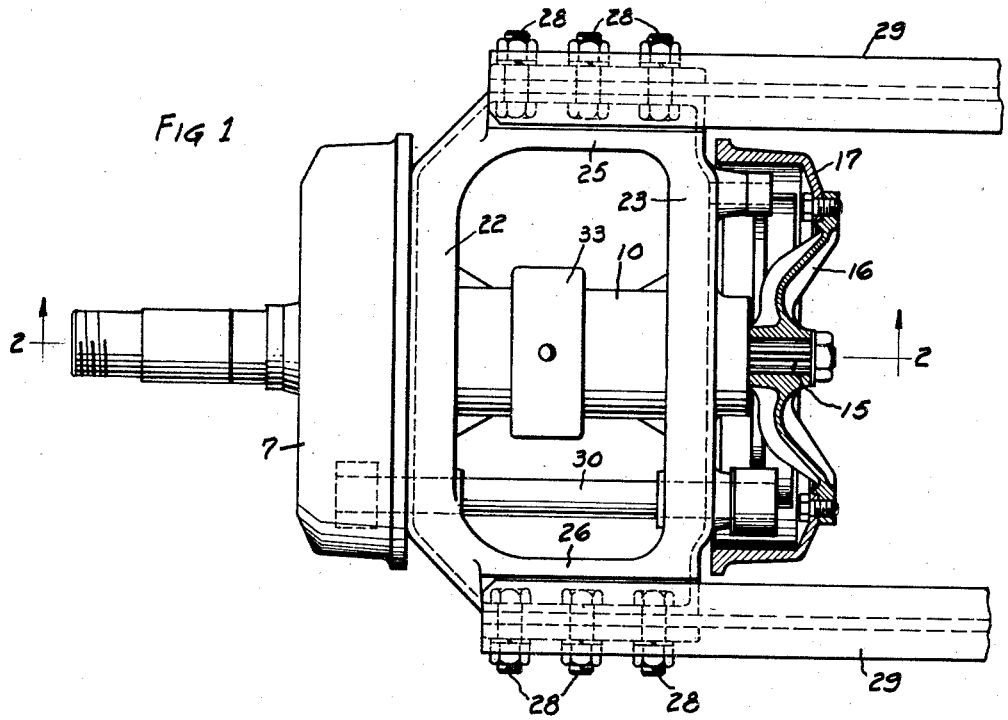
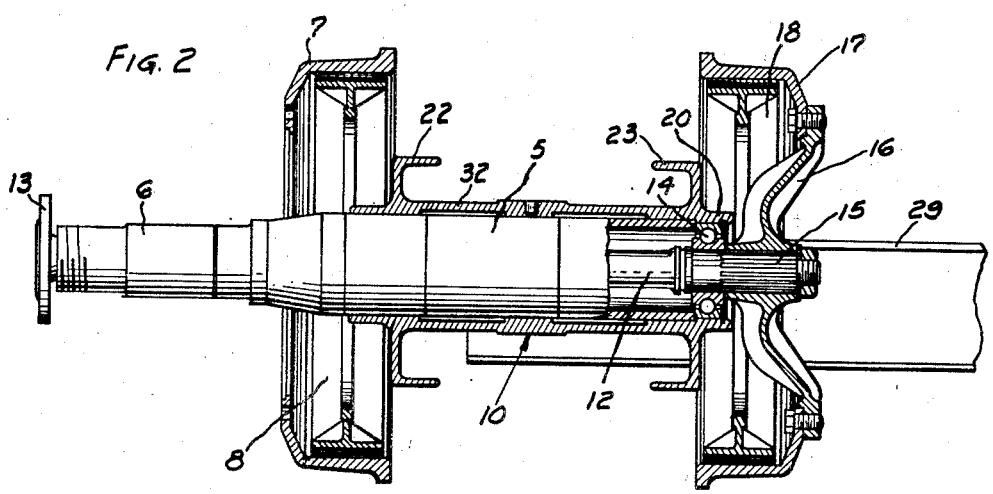
INVENTOR
FREDERICK W. BURGER.
BY *Walter E. Schirmer*
ATTORNEY Nov. 10, 1942.　　　F. W. BURGER　　　2,301,680
AXLE CONSTRUCTION
Filed Oct. 25, 1940　　　2 Sheets-Sheet 2

INVENTOR
FREDERICK W. BURGER
BY Walter E. Schirmer
ATTORNEY

Patented Nov. 10, 1942

2,301,680

UNITED STATES PATENT OFFICE 2,301,680

AXLE CONSTRUCTION

Frederick W. Burger, Niles, Mich., assignor to Clark Equipment Company, Buchanan, Mich., a corporation of Michigan Application October 25, 1940, Serial No. 362,757

9 Claims. (Cl. 301—124)

This invention relates to an axle construction for a trailer or dead axle in which dual wheels are provided at each end of the axle which are capable of rotating independently of each other and capable of being independently braked.

The present invention is a further development of the disclosure in the copending application of Burton L. Mills, Serial No. 272,085, filed May 6, 1939, and consists primarily in an improved type of spring pad casting adapted to be mounted on the wheel spindle and in turn arranged for supporting the brakeshoe mechanism, as well as providing the torque resisting member between the two dual wheel spindle structures.

In the application referred to above, it was found that the type of supporting member upon which the spring was mounted, and which in turn interconnected the two wheel spindles and also provided the support for the braking member, could be improved upon and the entire design strengthened and lightened in weight.

The present invention therefore contemplates, in connection with a wheel spindle upon which are mounted two independently rotatable wheels, a supporting member which interconnects opposed wheel spindles at opposite sides of the vehicle, which acts as the support for the spring and also acts as the brake supporting means. This member is so arranged as to have sufficient lateral extent to compensate for any bending loads imposed thereon due to the interconnection between the two wheel spindles. Also, as now designed, the member has ample capacity for taking any torque and braking reactions incident to a trailer axle of this type.

Other objects and advantages of the present invention will appear more fully from the following detailed description which, taken in conjunction with the accompanying drawings, will disclose to those skilled in the art the particular construction and operation of a preferred form of the present invention.

In the drawings:

Figure 1 is a top plan view, partly in section, of an assembly embodying the present invention;

Figure 2 is a sectional view taken substantially on line 2—2 of Figure 1;

Referring now in detail to the drawings, I have disclosed a wheel spindle member 5 which has a reduced extending end portion indicated at 6, upon which are adapted to be mounted a pair of independently rotatable wheels in the same manner as described in the above-mentioned copending application.

Figure 3:
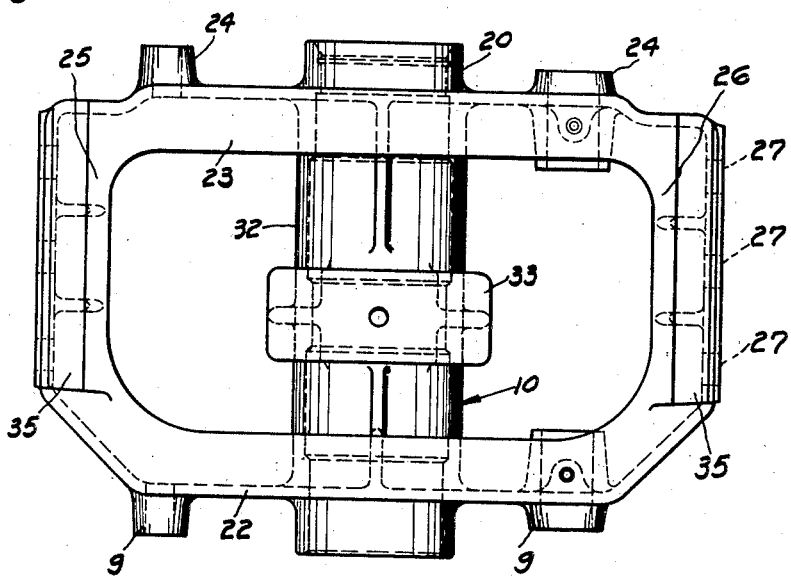
Figure 3 is a detail plan view of the supporting member.

The inboard wheel member is adapted to have secured thereto the brake drum 7, which brake drum is engaged by the internal expanding brakeshoes 8 carried on suitable pins 9 formed in the supporting member 10 and indicated in detail in Figure 3. Extending through the spindle member 5 is the shaft 12 which, at its outer end, is provided with the flange 13 adapted to be bolted to the outboard wheel spider. At its opposite end the shaft 12 is mounted in a thrust bearing 14 and is splined as indicated at 15 to receive the brake drum supporting member 16 to which the brake drum 17 is secured. It will therefore be apparent that the brake drum 17 is secured for conjoint rotation with the outboard wheel, and consequently the application of the brakeshoes 18 thereto will result in applying braking effort to the outboard wheel. Intermediate the brake drums the supporting member 10 is secured over the spindle 5, preferably having a press fit thereon and being welded thereto. The boss 20 of the supporting member 10 is adapted to cooperate with the end of the spindle member for locking the bearing 14 in position. The member 10 is provided with two axially spaced transversely extending portions 22 and 23, respectively, the portion 22 carrying the bosses 9 which support the brake shoes 8 and the associated mechanism normally carried upon a backing plate. The member 23 has a corresponding series of bosses 24 which support the brake shoes 18 and the associated actuating mechanism, there preferably being a thin plate carried by these bosses to close the brake drum against the entrance of moisture, dirt, or the like. The transversely extending portions 22 and 23, which are preferably channel shaped as clearly indicated in Figure 2, converge at their ends to form end portions 25 and 26, respectively, these end portions being provided with openings 27 adapted to receive the bolts 28 whereby the web portion of suitable I beams 29 may be secured thereto, these I beams being connected at their opposite ends to a corresponding member 10 supporting the opposite wheel spindle. The bosses 9 and 24 of the member 10 adjacent the end 26 provide through journals in which is mounted a cross shaft 30, this cross shaft being actuated in any suitable manner to rotate suitable actuating means for the brake shoes. Preferably, the cross shaft 30 is pneumatically actuated to rotate suitable brake actuating wedges which expand the ends of the shoes into frictional braking engagement with the brake drums. It will be noted that the portion of the supporting member 10 intermediate the transverse channels 22 and 23 is open, and consequently the cross shaft 30 extends through this opening and the actuating means may be attached to the spindle or sleeve portion 32 of the member 10. In addition, the spindle portion 32 of the member 10 is provided with the transversely extending spring pad or support 33, which is of rectangular section and is disposed intermediate the transverse channels 22 and 23. This provides an opening through which the center of a longitudinally extending leaf spring assembly may be secured to the supporting member 10, and consequently support the body of the vehicle from the wheel spindle.

Figure 4:
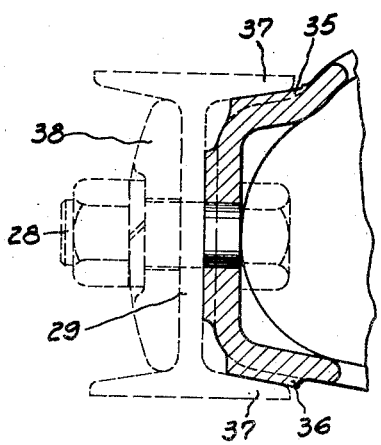
Figure 4 is a sectional view taken substantially on line 4—4 of Figure 1.

It will be apparent that with such a construction there is an appreciable bending moment imposed upon the wheel spindle which in turn is transmitted to the cross members 29 that interconnect the two spindles. To insure proper strength and resistance against this bending moment, the transverse members 22 and 23 are axially spaced an appreciable distance so as to provide adequate support for the wheel spindle. In addition to this, the end portions 25 and 26 of the member 10 are of such length as to afford sufficient bolting area so that a rigid connection can be made with the cross members 29, which will insure imparting of the stresses to both of the portions 22 and 23. In this connection it will be noted that the ends of the member 10 are provided with pad portions 35 and 36, shown clearly in Figure 4, whereby the flange portions 37 of the cross members 29 bear against these pad portions and prevent any possible relative movement between the I beam and the ends of the supporting member 10. This full bearing surface insures that any bending stress imparted from the cross members 29 to either of the wheel spindle supporting members 10 will be transmitted to both of the transverse channels 22 and 23 which in turn are axially spaced apart a distance sufficient to insure support of the wheel spindle 5 against cantilever stresses. It will also be noted that the load on the bolts 28 is distributed to the I beam 29 over an appreciable area by means of the members 38 which are clamped against the web of the I beam and extend the full depth of this web throughout the bolting area.

It is therefore believed apparent that I have provided an improved supporting member in which the stresses imparted thereto by the loads and reactions imposed upon the wheel spindle can be adequately supported and divided in such manner as to insure maintaining true alinement of the wheels under all conditions.

I am aware that certain details may be modified without in any way departing from the present invention, and I therefore do not intend to be limited except as defined by the scope and spirit of the appended claims.

I claim:

1. In combination, a pair of parallel laterally spaced axle members, a tubular wheel spindle disposed therebetween, and means for supporting said spindle from said members comprising a body member having a tubular sleeve portion receiving said spindle, a pair of transversely extending arm portions on said sleeve portions spaced axially thereon, web portions interconnecting the free ends of said arm portions, and means on said web portions rigidly securing the same to said supporting members.

2. In combination, an axle spindle, a supporting member comprising a substantially rectangular body portion having an integral transverse sleeve portion receiving said spindle, means formed on each side of said body portion providing supports for brake plate members, and axle frame members secured to the opposite ends of said body portion.

3. The combination of claim 2 wherein said sleeve portion is provided with an integral spring pad portion intermediate said sides of said body portion.

4. In combination, an axle spindle, a supporting member therefor comprising a sleeve portion receiving the inboard end of said spindle, transversely extending arms having their central portions integrally joined to each end of said sleeve portion, web portions interconnecting corresponding ends of said arms, and axle frame members rigidly secured to said web portions.

5. The combination, with a tubular axle spindle, and a pair of cross members spaced on opposite sides of said spindle, of connecting means therebetween comprising a sleeve portion receiving said spindle and having transversely extending arms at each end thereof joined to said sleeve portion intermediate their ends, means interconnecting the free ends of said arms and securing the same rigidly to said cross members, and boss means formed on the outer faces of said arms for receiving brake actuating mechanisms.

6. The combination of claim 5 further characterized in the provision of a spring pad formed on said sleeve portion intermediate said arms.

7. In combination, a tubular axle spindle, a pair of laterally spaced axle frame members, means for interconnecting said spindle and frame members comprising a casting having a rectangular body portion provided with an intermediate transverse sleeve receiving one end of said spindle, and integral pad means at the ends of said body portion forming supports to which said frame members are secured.

8. A casting of the class described including a sleeve portion adapted to receive and rigidly support an axle spindle, transversely extending parallel arms formed integral with the ends of said sleeve portion, and integral webs joining the free ends of said arms and providing a rigid support for receiving the adjacent ends of laterally extending axle frame members.

9. The casting of claim 8 further characterized in the provision of a spring pad formed on said sleeve portion intermediate said arms.

FREDERICK W. BURGER.